United States Patent Office 3,646,236
Patented Feb. 29, 1972

3,646,236
DISPROPORTIONATION OF TOLUENE WITH A PLATINUM-RHENIUM-SOLID OXIDE CATALYST
Carl D. Keith, Summit, Milton H. Dalson, Mendham, and William C. Pfefferle, Middletown, N.J., assignors to Engelhard Minerals & Chemicals Corporation, Newark, N.J.
No Drawing. Filed Mar. 27, 1970, Ser. No. 23,441
Int. Cl. C07c 3/62
U.S. Cl. 260—672 T
15 Claims

ABSTRACT OF THE DISCLOSURE

There is disclosed a method for disproportionating toluene to benzene and xylene. The process is conducted in the presence of hydrogen and a catalyst containing a platinum group metal and rhenium on a porous, solid, acidic support. Lower alkylbenzenes of 9 to 10 carbon atoms may also be fed to the reaction zone.

---

The invention relates to the disproportionation of toluene to obtain good yields of the more valuable xylene and benzene, and is particularly concerned with the catalytic disproportionation of toluene emplying a catalyst containing a platinum group metal and rhenium on a porous, solid, acidic support. The yield of xylenes can be increased by feeding lower alkylbenzenes of 9 to 10 carbon atoms to the disproportionation reaction zone.

Under appropriate conditions and in the presence of a suitable catalyst, two moles of toluene will undergo disproportionation to yield benzene and xylene. The reaction is of particular value as a source of mixed xylenes from which the para-xylene isomer, used in the production of terephthalic acid, may be separated, for example by crystallization to separate para-xylene from the metaisomer. The yield of the para-isomer can be further increased by isomerizing the mixed xylenes in the crystallization mother liquor using known methods.

In the disproportionation process of the present invention toluene and, if desired, $C_9$ or $C_{10}$ lower alkylbenzenes are converted at elevated temperatures to reaction mixtures containing xylene and benzene. The conversion is conducted in the presence of free hydrogen and a catalyst which exhibits outstanding activity, selectivity and aging characteristics and is stable, with respect to crush strength and surface area. The catalyst used in this invention includes minor, catalytically-effective amounts of both a platinum group metal and rhenium supported on a porous, solid, acidic base. The catalyst generally contains about 0.01 to 3 weight percent, preferably 0.1 to 2 weight percent, of each of the platinum group metal and rhenium. Platinum is the most preferred metal in such catalysts but other platinum group metals such as palladium and rhodium can be used. When the catalyst is in a virgin state the promoting metals are preferably for the most part undetectable by X-ray diffraction analysis, which indicates that if the metals are present in the catalyst as elemental metals or alloys, their crystallite sizes are less than about 50 A.

A common method of providing the platinum group metal in the catalyst is by contact of the support, either in hydrous or in calcined form, with an aqueous solution of a chlorine-containing compound, for instance chlorplatinic acid. In this manner, chlorine can be incorporated in the catalyst for instance, in amounts of about 0.2 to 2 weight percent, preferably about 0.3 to 1 weight percent. Such amounts of chloride can also be provided in the catalyst from a source other than the compound supplying the platinum group metal. Rhenium can also be added to the aqueous solution of a rhenium compound, e.g. perrhenic acid or ammonium perrhenate. If promoting metal is added to a calcined support, the resulting composite is generally recalcined.

Calcination of the catalysts used in this invention can be conveniently conducted at temperatures of the order of about 700 to 1200° F. or more, for instance in an oxygen-containing gas, and this operation can be controlled to give a final catalyst of desired surface area. At an appropriate stage in the manufacture of the catalyst, the particles can, if desired, be formed into macrosize as distinguished from finely-divided or fluidized catalyst types. The macrosize particles frequently have diameters in the range of about 1/64 to 3/8 inch, preferably about 1/32 to 1/4 inch, and if not spherical, the particles usually have lengths of about 1/64 to 1 inch or more, preferably about 1/8 to 1/2 inch.

As noted, the catalysts employed in the process of the present invention contain the platinum group metal and rhenium on a porous, solid, acidic support or base. The base exhibits substantial acidity, i.e., having a tertiary butylbenzene dealkylation activity of at least about 200 cubic centimeters (STP) per gram per minute at 455° C., as measured, without water addition, by the method of Marvin F. L. Johnson and John S. Melik, "Dealkylation of t-Butylbenzene by Cracking Catalysts," Journal of Physical Chemistry, vol. 65, pp. 1146–1150 (1961), preferably such activity is about 500 to 5000 or more. When reference is made herein to t-butylbenzene dealkylation activity such is indicated as measured by this test published by Johnson and Melik. Surface areas of such bases are usually a minimum of about 50 square meters per gram, preferably about 150 to 900 or more square meters per gram. The support constitutes the major portion of the catalyst, e.g. at least about 90%, preferably at least about 95%, by weight, and can be of a variety of materials among which are combinations of silica, alumina, zirconia, titania, magnesia, boria and aluminosilicates, especially those crystalline aluminosilicates of relatively uniform pores having openings whose diameters are at least about 6 angstrom units, preferably in the approximate 10 to 15 angstrom unit range. These supports, which are preferably metal oxides, can also contain halogen, especially fluorine and chlorine. The halogens can be added to the catalyst as for instance, hydrogen fluoride, ammonium perfluoroborate, silicon tetrachloride, etc.

Particularly useful acidic materials are boria-alumina, silica-alumina, including aluminosilicates, especially crystalline aluminosilicates such as the mordenite and faujasite types. The crystalline aluminosilicates usually have silica-to-alumina mole ratios of at least about 2:1, for instance about 2 to 12:1, preferably about 4 to 6:1. The crystalline aluminosilicates are frequently available or made in sodium form and this component can be reduced, for instance to less than about 4, or even less than about 1, weight percent, through ion exchange with hydrogen ions, hydrogen-precursors such as ammonium ions, or polyvalent metals. Suitable metals include the rare earths such as cerium, and their mixtures as well as the Group II–A metals. Mixtures of alumina and amorphous silica-alumina cracking catalysts, especially those having a major proportion of silica, e.g. about 60 to 90 weight percent silica and about 10 to 40 weight percent alumina, are suitable bases. Advantageous bases are also composed of mixtures of amorphous silica-alumina or alumina mixed with crystalline aluminosilicates, for instance containing about 0.1 to 25 weight percent of the crystalline aluminosilicate, preferably about 1 or even 5 to about 15 weight percent. Amorphous silica-alumina mixed with alumina provides another catalyst base useful in this invention.

The disproportionation reaction conditions used in the method of the present invention include a temperature sufficient to maintain the hydrocarbon feed in the vapor phase under the pressure employed. Generally, this temperature will be from about 300 to 550° C., preferably about 350 to 525° C., while the pressure will often be superatmospheric, for instance, ranging from about 5 to 1000 p.s.i.g., preferably about 50 to 750 p.s.i.g. The catalyst can be used as a fixed, moving or fluidized bed or in any other convenient type of handling system. The fixed bed system seems most advantageous at this time and the space velocity will in most cases be from about 0.05 to 20, preferably about 0.5 to 10, weights of total toluene and $C_9$ to $C_{10}$ lower alkylbenzenes per weight of catalyst per hour (WHSV). The fluid materials in the disproportionation reaction zone preferably contain less than 20 parts per million by weight of sulfur, or even less than about 5 parts per million, based on the total toluene and $C_9$ to $C_{10}$ lower alkylbenzene feed. Free or molecular hydrogen is present in the reaction system and the hydrogen to total toluene and $C_9$ to $C_{10}$ lower alkylbenzene feed molar ratio will usually be from about 0.01 to 20:1 or more, preferably about 2 to 10:1. Conveniently, the hydrogen concentration is maintained by addition of hydrogen and recycling hydrogen-rich gases from the reaction zone.

If more xylene in relation to benzene is desired from the process of this invention, the feedstock can be varied by introducing $C_9$ or $C_{10}$ lower alkyl benzenes along with the toluene. These lower alkylbenzenes have 9 to 10 carbon atoms and 1 to 4 methyl groups, and thus any other alkyl groups are ethyl or propyl. Thus, the aromatic streams available as a source of methyl groups for transalkylation of toluene frequently do not consist only of methylaromatics. For example, the $C_9+$ product obtained from a xylene isomerization process normally contains substantial ethyl (and possibly higher alkyl) ring substituents. Ethyl or higher alkylaromatic substituents tend to crack more readily than methyl groups to form olefins and the parent aromatic ring. Higher temperatures also promote the cracking reaction. As a result, the preferred conditions for a particular operation can be dependent on the composition of the $C_9+$ stream, the extent to which the $C_9+$ stream is recycled, and the ratio of benzene to xylenes desired in the product. In a process involving recycle, the ethyl substituents may also be controlled by fractionating and removing a portion of the stream rich in n-propylbenzenes and ethyltoluenes or rich in ethylxylenes. The $C_9$ to $C_{10}$ lower alkylbenzenes can be obtained from various sources such as naphtha reformate and coal tar, and in addition, the concentration of aromatics in the hydrocarbon streams can be increased by fractionation or solvent extraction procedures. Thus, trimethylbenzenes, for example, those formed as by-products of the disproportionation reaction, can be incorporated in the toluene feed, thus effecting additional xylene production through transalkylation. The amount of the higher methylaromatics added to the feed, either from an external supply or by recycling, can be a small amount effective to increase the xylene/benzene ratio in the product, as about 5 to 60, preferably about 15 to 50, weight percent based on the toluene fed to the reaction zone.

Carbonaceous deposits can accumulate on the catalysts of this invention as disproportionation proceeds, and the catalysts can be regenerated by carbon burn-off which improves the catalytic characteristics sufficiently for the catalysts to be reused on an economic basis. At the beginning of regeneration, the carbon content of the catalysts is generally above about 0.5 weight percent, often greater than about 3 weight percent. During regeneration of the catalysts by burning, the carbon level is often reduced to below about 0.5 weight percent, preferably below about 0.2 weight percent. This burning can be conducted through contact of the catalysts with an oxygen-containing gas and generally the amount of oxygen is controlled to maintain the temperature of the catalysts from about 700 to about 900 or 1000° F., preferably in the temperature range of about 700 to 850° F. The pressure maintained during burning is preferably elevated, for instance, is about 50 to 500 p.s.i.g. The controlled burning is usually initiated with an inert gas, e.g. nitrogen, carbon dioxide or their mixtures, containing a small amount of oxygen, for instance, up to about 1 mole percent and preferably with an oxygen partial pressure of at least about 0.2 p.s.i.g. When the bulk of the carbon has been removed from the catalysts by a gas containing the relatively low concentration of oxygen, the amount of oxygen can be increased somewhat to insure that sufficient carbon has been removed from the catalysts without exceeding the desired temperature. This type of treatment is exemplified by one or more burns-through of a fixed catalyst bed at about 800° F. to 850° F., and about 100 to 500 p.s.i.g., with a gas containing above about 1 to about 3 or somewhat greater mole percent oxygen. Other suitable carbon-burning procedures can be employed as long as the temperatures are controlled and the carbon level of the catalysts is adequately lowered. During carbon burn-off and any subsequent treatments of the catalysts with an oxygen-containing or other gas at elevated temperatures, the gas should be dry enough to avoid undue sintering of the catalysts and loss of surface area. Such loss generally increases as temperature, water content of the gas or treating time is raised.

Especially where the crystallite size of the promoting metals on the catalysts is to be reduced, the catalysts can, after carbon burn-off, be contacted with an oxygen-containing gas at a temperature of about 800 to 1000° F., preferably about 850 to 950° F., and, if desired, an elevated pressure such as about 100 to 500 p.s.i.g. This treatment can be referred to as an air soak and the oxygen content of the gas is usually greater than that present in the gas employed for carbon burn-off. Thus, the oxygen content of the gaseous stream employed for air soaking is often at least about 5 mole percent with there having been found no particular reason for increasing the gas content above about 20 mole percent. The air soaking period is generally at least about one hour and is usually continued for several hours, for instance, in the range of about 5 to 24 hours. Regeneration and air soaking procedures suitable for the catalysts of the present invention are disclosed in U.S. Pat. No. 2,922,756, herein incorporated by reference.

The virgin catalysts of this invention or used catalysts, of such types, say after regeneration with or without reactivation, can be reduced by contact with a gaseous stream which contains molecular hydrogen. The treatment can be at an elevated temperature, for instance, about 600 to 1000° F., preferably about 750 to 950° F. Elevated pressures are preferably used in the reduction and can be, for example, about 20 to 600 p.s.i.g. preferably about 50 to 350 p.s.i.g. Apparently, the reduction converts the catalytic promoting metals to their elemental state, but if a vaporous sulfiding agent be present some or all of the promoting metals may be sulfided. The gas stream employed during reduction is often composed of about 70 to 100 volume percent hydrogen, preferably about 95 or 99 to 100 volume percent, with any remaining components being up to about 30 volume percent of inert gas such as nitrogen. The gas advantageously contains less than about 1 volume percent hydrocarbons boiling above methane, preferably less than about 0.1%.

To avoid undue hydrocracking of the hydrocarbon feedstock during the initial period of hydrocarbon processing after the catalysts of the present invention are placed on-stream, the catalysts can be contacted with a gas containing sulfur-providing component in vaporous form. This sulfiding treatment can be conducted simultaneously with or subsequent to the reduction. If sulfiding is conducted simultaneously with the reduction, a non-carbonaceous sulfur compound is preferably used due to the presence of oxygen in the system and to avoid any localized overheating of the catalyst. A suitable sulfur-providing material or sulfiding agent is H₂S. The amount of sulfiding agent employed is at least about 25% or even at least about 50% of the stoichiometric amount needed to give one atomic weight of sulfur for each atomic weight of total platinum group metal and rhenium in the catalyst, preferably the amount is at least about 50% to say up to about 500% or more. The sulfiding operation can be done at an elevated temperature, e.g. about 650 to 950° F., and at any suitable pressure, preferably an elevated pressure such as about 100 to 500 p.s.i.g. The sulfiding gas is reductive and usually contains a minor amount of the sulfur-bearing component, e.g. about 0.1–10 volume percent, preferably about 0.2 to 3%, with the major component being hydrogen or an inert gas such as nitrogen. When the sulfiding is conducted simultaneously with or subsequent to reducing the catalysts with hydrogen, the catalysts are in sulfided form when they first contact the hydrocarbon being processed which avoids excessive hydrocracking with its attendant yield and selectivity losses.

It can be further advantageous in minimizing hydrocracking caused by the reduced catalysts whether presulfided or not, to supply vaporous sulfiding agent to the conversion system when charging of the aromatic hydrocarbon feedstock is begun. Thus a small amount of the sulfiding agent, sufficient to significantly reduce hydrocracking during the initial portion of the processing cycle, can be added to the system. The sulfiding agent can conveniently be charged with the recycle gas or with the hydrocarbon stream. The amounts of sulfiding agent employed include about 1 to 500 p.p.m. by volume based on the hydrogen passing to the reaction system, preferably about 5 to 200 p.p.m. This sulfiding-agent addition can be continued as long as the operator desires but often the addition will approximate the time period in which, in the absence of the sulfiding-agent addition, the catalysts would cause significantly excessive hydrocracking. The period of sulfiding-agent addition upon placing the reduced catalysts back on processing can include, for instance, about 1 to 60 or more days and is often about 3 to 10 days.

It may also be advantageous to incorporate in the reaction system a small amount of ammonia or a material which is decomposed under the reaction conditions to supply ammonia such as the lower alkyl amines, for instance, butyl amine. The ammonia can serve to give better catalyst performance during an initial period of relatively high activity in order that excess hydrocracking is suppressed. The amount of ammonia is often about 5 to 200 parts per million by weight based on the total toluene and lower alkylbenzene feed, preferably about 10 to 100 parts per million. As the reaction proceeds it may be necessary to decrease the amount of ammonia and to even omit its introduction entirely in order to obtain an adequate approach to equilibrium. It may be advantageous to enhance the activity of the system by providing about 5 to 200 p.p.m. water based on the weight of the total toluene and lower alkylbenzene feed, preferably about 25 to 75 p.p.m. The water may be especially desired when the overall porous oxides of the catalyst have a tertiary butylbenzene dealkylation activity of below about 30.

The following catalysts are evaluated in the disproportionation of toluene and a mixed feed containing toluene and methyl and ethylbenzenes.

CATALYST A

The catalyst base is a physical admixture of spray-dried alumina having a t-butylbenzene dealkylation activity of 13 and being a mixture of:

| | Percent |
|---|---|
| Bayerite | 45 |
| Gibbsite | 10 |
| Nordstrandite | 20 |
| Boehmite | 22 |

3% amorphous hydrous alumina; with about an equal amount by weight (on an ignited basis) of spray-dried, microspherical, amorphous silica-alumina cracking catalyst containing about 12 weight percent alumina and after partial deactivation and calcination having a t-butylbenzene dealkylation activity of about 1600. The mixture has impregnated therein 0.6% platinum and 0.6% rhenium (calcined basis) through the use of chloroplatinic and perrhenic acids. The mixture, containing sufficient water to provide an extrudable consistency, is extruded into particles ¹⁄₁₆ inch in diameter and about ¼ to ¾ inch in length. The extruded particles are dried and then calcined in a stream of dry air at 900° F. for three hours. The calcined particles have a surface area of about 400 square meters per gram, and a calcined composite of the porous oxides in the catalyst, that is, on a non-platinum, non-rhenium basis, exhibits a t-butylbenzene dealkylation activity of about 800.

CATALYST B

The catalyst base is made by mixing a spray-dried alumina (t-butylbenzene dealkylation activity of 5) containing about 75% boehmite having a crystallite size of 35 A., and about 25% amorphous hydrous alumina, with 25% based on the total ignited weight of an ammonium-exchanged, crystalline aluminosilicate of the faujasite type having a silica-to-alumina mole ratio of 4.5:1 and pore openings of 13 A. diameter. The mixture has impregnated therein 0.7% platinum and 0.5% rhenium (calcined basis) through the use of chloroplatinic and perrhenic acids. The mixture is combined with water to give a material of extrusion consistency and is extruded into particles of the same size as those of Catalyst A. These particles are calcined in the manner of Catalyst A and the calcined catalyst has a surface area of about 375 square meters per gram. The composite porous oxides of the catalyst, that is on a non-platinum, non-rhenium basis, has a t-butylbenzene dealkylation activity of about 1000 after calcination.

Each of catalysts A and B is evaluated in the disproportionation of toluene and a mixed feed of 80% toluene and 20% C₉ methyl and ethyl benzenes. The catalyst is disposed in the reactor as a fixed bed and is prereduced in hydrogen at about 900° F. The feedstocks contain essentially no sulfur. The disproportionations are conducted at about 455° C., 400 p.s.i.g., 4 WHSV and 5:1 hydrogen to aromatic hydrocarbon mole ratio. Both catalysts A and B when used in the disproportionation system give good conversion and yields to xylenes and benzenes with both feedstocks. The catalysts also exhibit good life and relatively low coke formation during the disproportionation. The presence of C₉ aromatic in the feed increases the xylene to benzene ratio in the product.

The embodiments of the invention in which an exclusive property or privilege is claimed are defined as follows:

1. A process for disproportionating toluene to xylene and benzene, which comprises conducting the disproportionation in the presence of molecular hydrogen and under vapor phase disproportionation conditions including a temperature of about 300 to 550° C., and in contact with a catalyst comprised of minor amounts of each of platinum group metal and rhenium and a major amount of porous, solid oxide having a surface area of at least about 50 square meters per gram and a tertiary butylbenzene dealkylation activity at 455° C. (without water addition) of at least about 200 cubic centimeters (STP) per gram per minute.

2. The process of claim 1 in which the platinum group metal is platinum.

3. The process of claim 1 in which the platinum group is platinum and each of the platinum and rhenium is about 0.2 to 1% of the catalyst.

4. The process of claim 3 in which the catalyst base has a tertiary butylbenzene dealkylation activity of about 500 to 5000.

5. The process of claim 4 in which the catalyst base contains crystalline aluminosilicate having a silica-to-alumina mole ratio of about 2 to 6:1, pore openings of 10 to 15 A. diameter and a sodium content below about 1%.

6. The process of claim 4 in which the catalyst base contains amorphous silica-alumina.

7. The process of claim 4 in which the disproportionation conditions include about 350 to 525° C. and about 50 to 750 p.s.i.g.

8. The process of claim 1 in which the disproportionation feed is a mixture of toluene and $C_9$ to $C_{10}$ methyl benzenes.

9. The process of claim 8 in which the feed contains about 15 to 50% $C_9$ to $C_{10}$ methylbenzenes based on the toluene.

10. The process of claim 9 in which the platinum group metal is platinum.

11. The process of claim 9 in which the platinum group is platinum and each of the platinum and rhenium is about 0.2 to 1% of the catalyst.

12. The process of claim 11 in which the catalyst base has a tertiary butylbenzene dealkylation activity of about 500 to 5000.

13. The process of claim 9 in which the catalyst base contains crystalline alluminosilicate having a silica-to-alumina mole ratio of about 2 to 6:1, pore openings of 10 to 15 A. diameter and a sodium content below about 1%.

14. The process of claim 9 in which the catalyst base contains amorphous silica-alumina.

15. The process of claim 9 in which the disproportionation conditions include about 350 to 525° C. and about 50 to 750 p.s.i.g.

References Cited

UNITED STATES PATENTS

| | | | |
|---|---|---|---|
| 3,415,737 | 12/1968 | Kluksdahl | 208—139 |
| 3,523,914 | 8/1970 | Mitsche et al. | 252—455 Z |
| 3,558,523 | 1/1971 | Rausch | 260—668 A |
| 3,548,020 | 12/1970 | Gutberlet et al. | 260—672 T |

CURTIS R. DAVIS, Primary Examiner